United States Patent [19]
Hashimoto et al.

[11] Patent Number: 5,769,057
[45] Date of Patent: Jun. 23, 1998

[54] FUEL TANK SYSTEM

[75] Inventors: Takashi Hashimoto; Junichi Hanai; Tomoyuki Sato; Masami Honma; Kei Orita, all of Kanagawa-ken, Japan

[73] Assignee: Nissan Motor Co., Ltd., Kanagawa-ken, Japan

[21] Appl. No.: 729,236

[22] Filed: Oct. 9, 1996

[30] Foreign Application Priority Data

| Oct. 9, 1995 | [JP] | Japan | 7-261832 |
| Oct. 11, 1995 | [JP] | Japan | 7-262717 |
| Aug. 27, 1996 | [JP] | Japan | 8-224944 |

[51] Int. Cl.$^6$ .................................................. F02M 37/04
[52] U.S. Cl. ........................ 123/516; 123/519; 137/587
[58] Field of Search .................. 123/516, 518, 123/519, 520, 521; 137/587

[56] References Cited

U.S. PATENT DOCUMENTS

| 4,944,779 | 7/1990 | Szlaga | 123/519 |
| 5,024,687 | 6/1991 | Waller | 123/519 |
| 5,099,880 | 3/1992 | Szlaga et al. | |
| 5,244,022 | 9/1993 | Gimby | 137/587 |
| 5,474,048 | 12/1995 | Yamazaki | 123/519 |
| 5,570,672 | 11/1996 | Kunimitsu | 137/587 |
| 5,596,971 | 1/1997 | Kidokoro | 123/516 |
| 5,606,954 | 3/1997 | Yamazaki | 123/520 |

*Primary Examiner*—Carl S. Miller
*Attorney, Agent, or Firm*—McDermott, Will & Emery

[57] ABSTRACT

The fuel tank system comprises a tank body for containing fuel therein, a canister for disposing said fuel component, a filler tube connected with the tank body and forming a channel for supplying fuel to the tank body, a vent side check valve having a first chamber and a second chamber separated by a diaphragm, a signal tube connecting the first chamber of the vent side check valve with the upper part of the filler tube, a vent side tube for connecting the tank body with the canister via the second chamber of the vent side check valve and for introducing a gaseous body containing fuel component in the tank body to the canister via the second chamber when filling fuel, and an orifice for the signal tube, provided on the upper part of the signal tube on the filler tube side and having such an inside diameter and a length that may prevent the fuel permeation into the signal tube side from the filler tube side. Therefore, by the functions of the orifice, the permeation of the fuel into the signal tube can be controlled thus to maintain the functions of the vent side check valve.

19 Claims, 8 Drawing Sheets

FUEL TANK SYSTEM

BACKGROUND OF THE INVENTION

The present invention relates to a fuel tank system for use in vehicles, vessels, and the like.

The conventional fuel tank system of this type for use in vehicles is provided with a tank body and a filler tube for filling fuel which is connected with said tank body.

The upper part of the tank body is connected with a canister via an the evaporation side tube and with a vent side tube.

The half-way point of the evaporation side tube is provided an evaporation side check valve and on the half-way of the vent side tube is provided a vent side check valve.

The vent side check valve is divided into a first chamber and a second chamber by a diaphragm. The flow-in side tube and the flow-out side tube of the vent side tube are faced with the second chamber, and it is arranged so that the flow-in side tube and the flow-out side tube of the vent side tube may be communicated and also shut off by the opening and closing actions of the diaphragm. Further, a signal tube is provided between the first chamber and the filler tube.

The canister is open to the atmosphere by the orifice and is also connected with the engine side which is not shown via the tube.

In this structure, when fuel is filled, the filer cap of the filler tube is opened and a fuel supply nozzle is inserted from the fuel filling mouth of this tube to fill fuel. Fuel flows into the tank body from the filler tube, when the vapor(a gaseous body containing fuel component) produced in the tank body is introduced into the canister via the vent side check valve. That is, the first chamber is under the atmospheric pressure, namely, the pressure in the filler tube, via the signal tube while the filler cap is open, while the inside of the tank body is under a pressure which is higher than the atmospheric pressure because of the pressure of the fuel evaporating gas and the flow-in pressure, whereby the diaphragm is opened to introduce the vapor into the canister via the vent side tube, and air is exhausted into the atmosphere after fuel vapor has been adsorbed. In this way the gas in the tank body is exhausted to smoothen the fuel supply.

The evaporation side check valve is set at such a level that it may not open if the pressure is not higher than that of the vent side check valve, and therefore, the evaporation side check valve is closed while filling fuel.

On the other hand, if the pressure in the tank body goes up higher than a predetermined level with the filler cap being closed, the pressure in the filler tube becomes the same as that in the tank body. Thus, the pressure of the first chamber of the vent side check valve becomes the same as that in the flow-in side tube of the vent side tube and therefore the vent side check valve maintains a closed state.

When the vent side check valve is closed, the pressure in the tank body goes up and when it reaches a predetermined level, the evaporation side check valve opens for the evaporated gas to be introduced into the canister via the evaporation side tube.

Examples of this type are disclosed, for example, in U.S. Pat. No. 5,099,880.

However, in such conventional systems, because of the turning actions, etc. of vehicles causing fuel to move to the filler side, fuel may often enter into the signal tube from the upper part of the signal tube connected with the filler tube, thus sometimes causing malfunctions in the vent side check valve functions.

Further, outside air is drawn(inhaled) into the filler tube by the negative pressure caused by the moving pressure of the fuel to be sent under pressure from the filling nozzle. And if the amount of the outside air to be inducted is great, the amount of vapor occurring in the tank body increases and accordingly the amount of vapor to be introduced to the canister side via the vent side check valve increases, thus larger for adsorbing the fuel vapor.

SUMMARY OF THE INVENTION

The fuel tank system of the present invention comprises: a tank body for containing fuel therein; a canister for disposing of a gaseous fuel component; a filler tube connected with the tank body and forming a channel for filling fuel into the tank body; a vent side check valve having a first chamber and a second chamber separated by a diaphragm; a signal tube connecting the first chamber of the vent side check valve with the upper part of the filler tube; a vent side tube for connecting the tank body with the canister via the second chamber of the vent side check valve and for introducing a gaseous body containing fuel component in the tank body to the canister via the second chamber when filling fuel; and an orifice for the signal tube, provided on the upper part of the signal tube on the filler tube side and having such an inside diameter and a length that may prevent the fuel permeation into the signal tube side from the filler tube side.

Conventionally when the filler cap was closed, it was often the case that due to the turning actions of vehicles, etc., fuel could permeate into the inner parts from the upper end of the signal tube. However, according to the present structure wherein an orifice of a predetermined inside diameter and length has been formed on the upper end of the signal tube, it is possible to prevent the permeation of fuel into the signal tube from this orifice, thus making it possible to maintain the function of vent side check valve.

In addition to the above-mentioned tank body, canister, filler tube, vent side check valve signal tube and vent side tube, it is possible to add to the fuel tank system an air-storing part provided at the portion connected with the signal tube in the filler tube, wherein air is stored to prevent the fuel permeation into the signal tube to be caused by the turning actions, etc. of a vehicle.

Conventionally in the state wherein the filler cap is closed, if the turning actions of vehicles, etc. are made and if the fuel reaches the upper end of the signal tube in a fully filled state and the pressure in the tank body goes up, it is often the case that fuel could permeate into the inner parts from the upper end of the signal tube. However, according to the present structure wherein an air-storing part is formed, such a problem can be prevented. That is, in this case, the air in the air-storing part flows into the signal tube from the upper end of the signal tube for the fuel and therefore, the permeation of the fuel can be prevented.

Also, in addition to the above-mentioned tank body, canister, filler tube, vent side check valve, signal tube and vent side tube and air-storing part, it is possible to add to the fuel tank system a signal tube orifice as mentioned above.

According to the present structure, the function of the signal tube orifice makes it possible to further prevent the permeation of fuel into the upper end of the signal tube.

Further, the orifice for the signal tube is formed by the fitting member fitted on the upper end of the signal tube.

According to the above-mentioned construction, since the orifice can be formed by a fitting member which is different from the signal tube, an inside diameter and length thereof do not depend on the signal tube so that it is possible to set the orifice flexibly to some extent.

Further, the inclined opening is formed on the upper end of the circulation tube disposed next to the signal tube so that the fitting member can not be fitted.

According to the above-mentioned construction, by the inclined opening which is formed on the upper end of the circulation tube disposed next to the signal tube so as not to allow the fitting member to be fitted, the fitting member having the orifice can not be fitted. Thus, there is not a fear that the fitting member having the orifice is mounted on the upper end of the signal tube by mistake.

Further, the fitting member is welded in a cylindrical body inserted into the filler tube so that a predetermined interval is formed in order to form an opening hold projection for holding an opening of the orifice.

According to the above-mentioned construction, even if the fitting member which is fitted on the upper end of the signal tube is moved, the opening hold projection is welded in the cylindrical body so that a predetermined interval is formed between the cylindrical body and the fitting member in order to hold the opening of the orifice. Accordingly, the opening of the orifice is not closed.

Further, each opening hold projection is formed at three positions on a circumferential part of the opening of the orifice, respectively.

According to the above-mentioned construction, since each opening hold projection is formed at three positions on a circumferential part of the opening of the orifice, the fitting member is not inclined so as to be balancedly welded in the cylindrical body. Thereby, it is possible to form a predetermined interval approximately equally in order to obtain a useful effect in practice.

Also, in addition to the above-mentioned tank body, canister, filler tube, vent side check valve, signal tube and vent side tube, it is possible to add to the fuel tank system a circulation tube connecting the upper part of the tank body with the upper part of the filler tube, whose end connected with the filler tube is open above the inserting tip of the fuel filling nozzle to be inserted at the time of filling fuel.

According to the present structure, at the time of filling fuel, the vapor in the tank body flows into the canister side via the vent side check valve and simultaneously flows into the filler tube via the circulation tube. The flow-in position of the vapor into this filler tube is above the tip of the filling nozzle, and this is a position wherein jetting out of fuel from the fuel-filling nozzle causes a negative pressure. Accordingly the vapor from the circulation tube flows into the tank body with the fuel via the filler tube, thus circulating the vapor. By this, it is possible to decrease the amount of the outside air to be drawn into the filler tube from the atmosphere and thus making it possible to decrease the amount of vapor flowing into the canister and consequently to design the canister to be smaller.

Also, it is possible to provide the circulation tube with a circulation tube orifice for limiting the circulating amount of a gaseous body containing fuel component to be circulated into the filler tube from the tank body via the circulation tube, and to set the diameter of the orifice to be such that the circulating amount of a gaseous body containing fuel component may not become greater than the inhaling amount of a gaseous body containing fuel component to be flowed into the tank body by the fuel flow-in negative pressure at the time of filling fuel.

According to the present structure, the vapor circulated into the filler tube side from the circulation tube will not be released into the atmosphere.

Also, it is possible to provide the vent side tube with an orifice for the vent side tube for facilitating the circulation of a gaseous body containing fuel component in the tank body into the filler tube from the tank body via the circulation tube by making it difficult for the same to go through into the canister side.

According to the present structure, at the time of filling fuel, the amount of the vapor to be circulated to the filler tube side from the circulation tube is increased, so that it is possible to control the vapor flowing into the canister side.

Also, it is possible to provide the filler tube with a guiding means for guiding a gaseous body containing fuel component to be circulated into the filler tube from the circulation tube to the lower part in the filler tube.

According to the present structure, the vapor circulated into the filler tube from the circulation tube is guided towards the lower part in the filler tube by the guiding means, so that the circulation functions improved. Therefore, the vapor will not be released into the atmosphere from the filler tube and the inhalation of the outside air is further controlled.

Further, it is possible to use the guiding means as an air-storing part provided at the portion connected with the signal tube in the filler tube, wherein air is stored to prevent the fuel permeation into the signal tube to be caused by the turning actions, etc. of vehicles.

According to the present structure, the guiding means is provided also with the function of the air-storing part and therefore, by one means, two functions can be achieved, also making it possible to simplify the structure.

DESCRIPTION OF THE PREFERRED EMBODIMENT

A first embodiment of the present invention is described hereinafter.

FIGS. 1 to 7 show the first embodiments.

Figure 1:
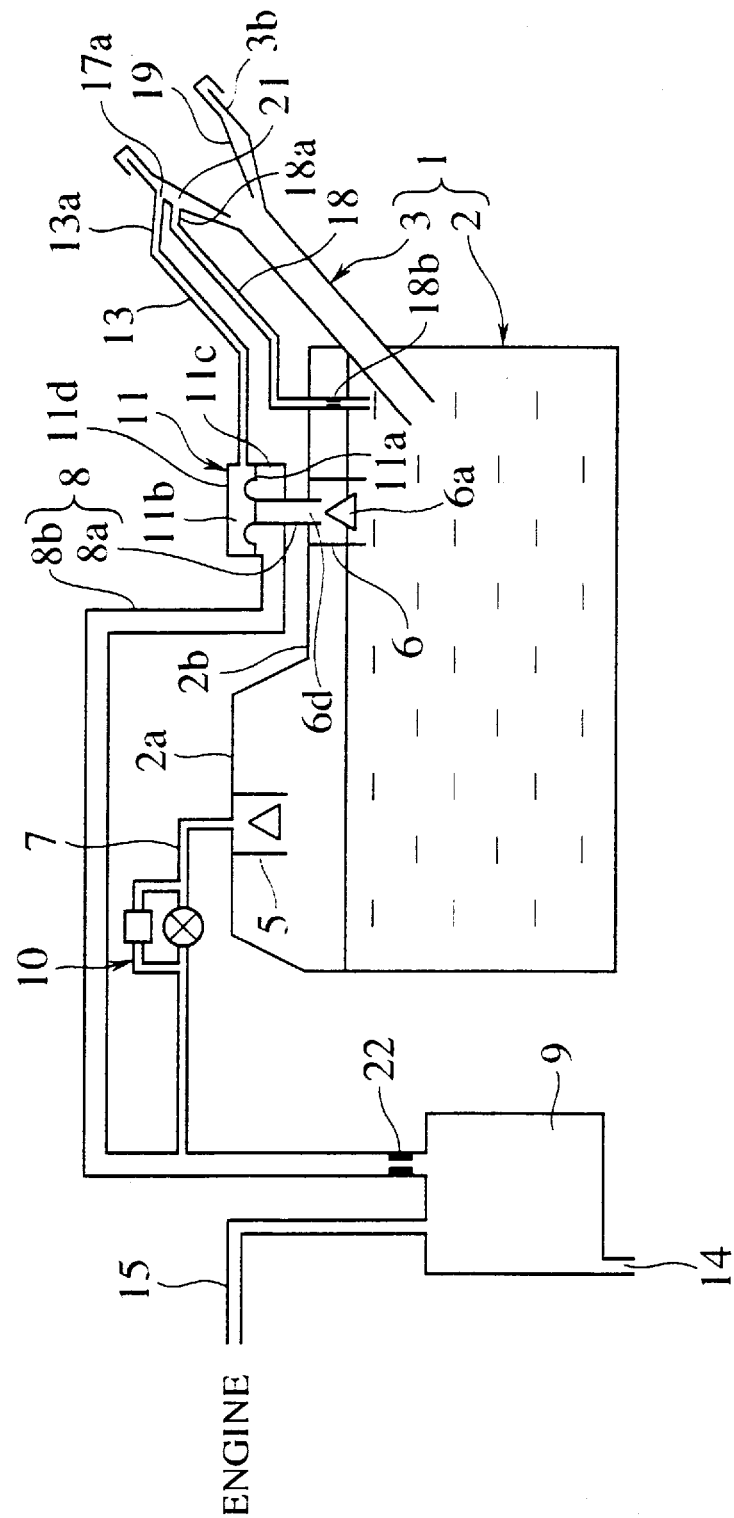
FIG. 1 is an outline view of the fuel tank system showing the first embodiment of the present invention.

First of all, the structure is explained. The numeral 1 in FIG. 1 is a fuel tank of a vehicle comprising a tank body 2 for containing fuel therein and a filler tube 3 connected with the tank body 2 to form a channel for filling fuel into the tank body 2.

On the upper part 2a of this tank body 2 are provided with an evaporation side float valve 5 and a vent side float valve 6.

The evaporation side float valve 5 is connected with the canister 9 via an evaporation side tube 7, and a vent side float valve 6 is connected with the canister 9 via a vent side tube 8. The canister 9 adsorption-treats the fuel component of the vapor(gaseous fuel).

On the half-way of the evaporation side tube 7 is provided an evaporation side check valve 10, and on the half-way of the vent side tube 8 is provided a vent side check valve 11.

The vent side check valve 11 is provided with a diaphragm 11a/in the case 11d along an approximately horizontal direction to divide the case 11d into an upper part and a lower part thus forming a first chamber 11b on the upper side of the diaphragm 11a and a second chamber 11c on the lower side thereof. The flow-in side tube 8a and the flow-out side tube 8b of the vent side tube 8 are faced with the second chamber 11c. It is so constructed that by the opening and closing actions of the diaphragm 11a, the flow-in side tube 8a and the flow-out side tube 8b may be communicated or shut off.

More specifically, the flow-in side tube 8a is disposed along the up-down direction in the second chamber 11c of the case 11d and an opening at the upper end is so arranged as to be opened and closed by the diaphragm 11a. In the opened state, the flow-in side tube 8a and the flow-out side tube 8b are arranged so as to be communicated. As shown in FIG. 1, the circumferencial part of the present diaphragm 11a is fixed on the case 11d and is made resilient towards the downward directions by a coil spring, not illustrated.

On the other hand, a signal tube 13 is provided between the first chamber 11b and the upper part 3b of the filler tube. The upper part 13a of this signal tube 13 is connected with the upper part 3b of the filler tube 3 and a fitting member 17 having an orifice(a signal tube orifice) 17a is mounted in this upper end 13a.

The inside diameter φ and the length L of the orifice 17a are so determined as to prevent the permeation of the fuel into the signal tube 13 from the side of the filler tube 3.

Figure 2:
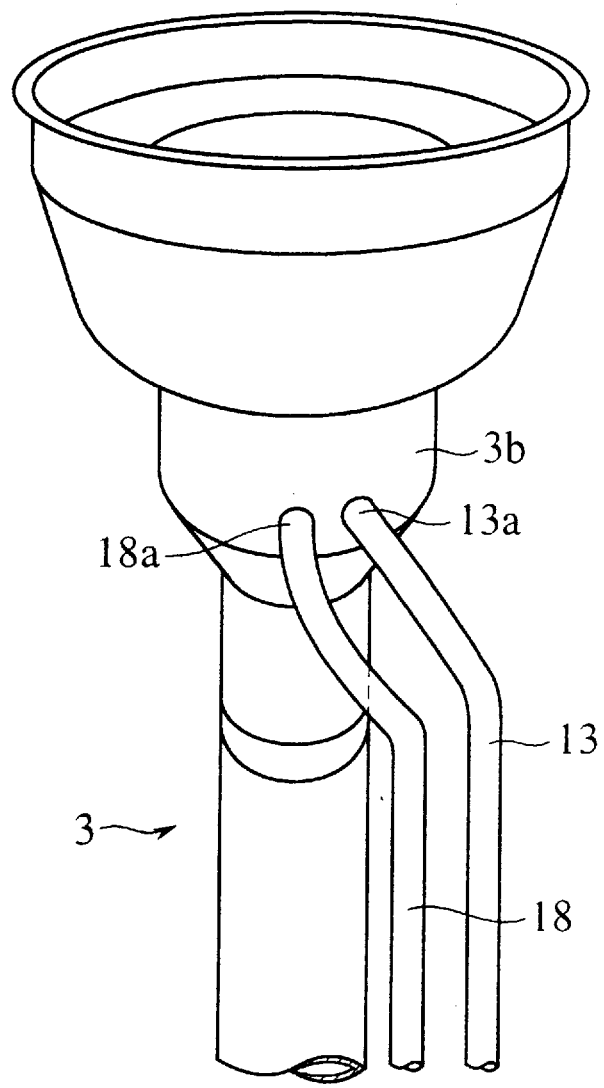
FIG. 2 is a perspective view showing the state wherein the filler tube as shown in the first embodiment is connected with the signal tube and the circulation tube.
Figure 3:
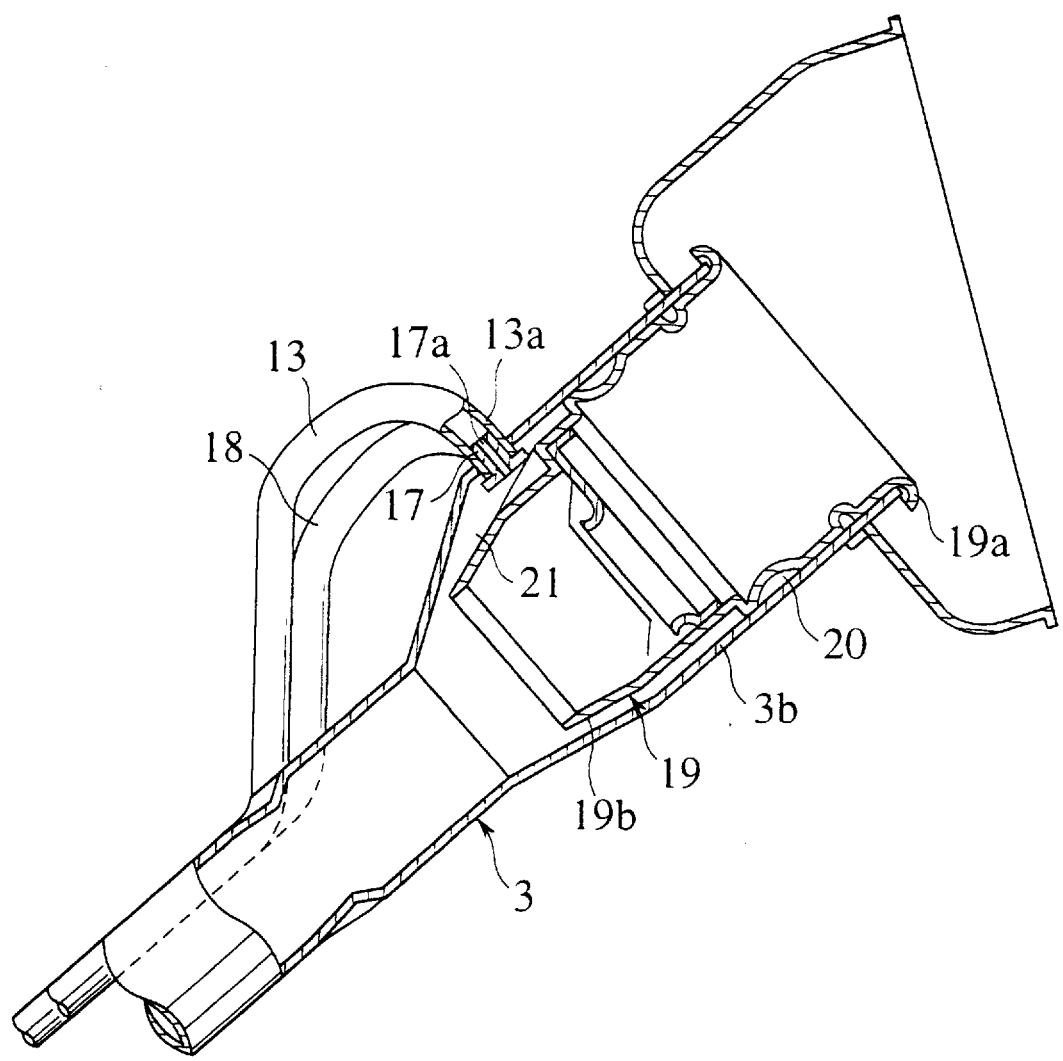
FIG. 3 is a sectional view of the filler tube as shown in the first embodiment showing the portion connected with the signal tube.
Figure 4:
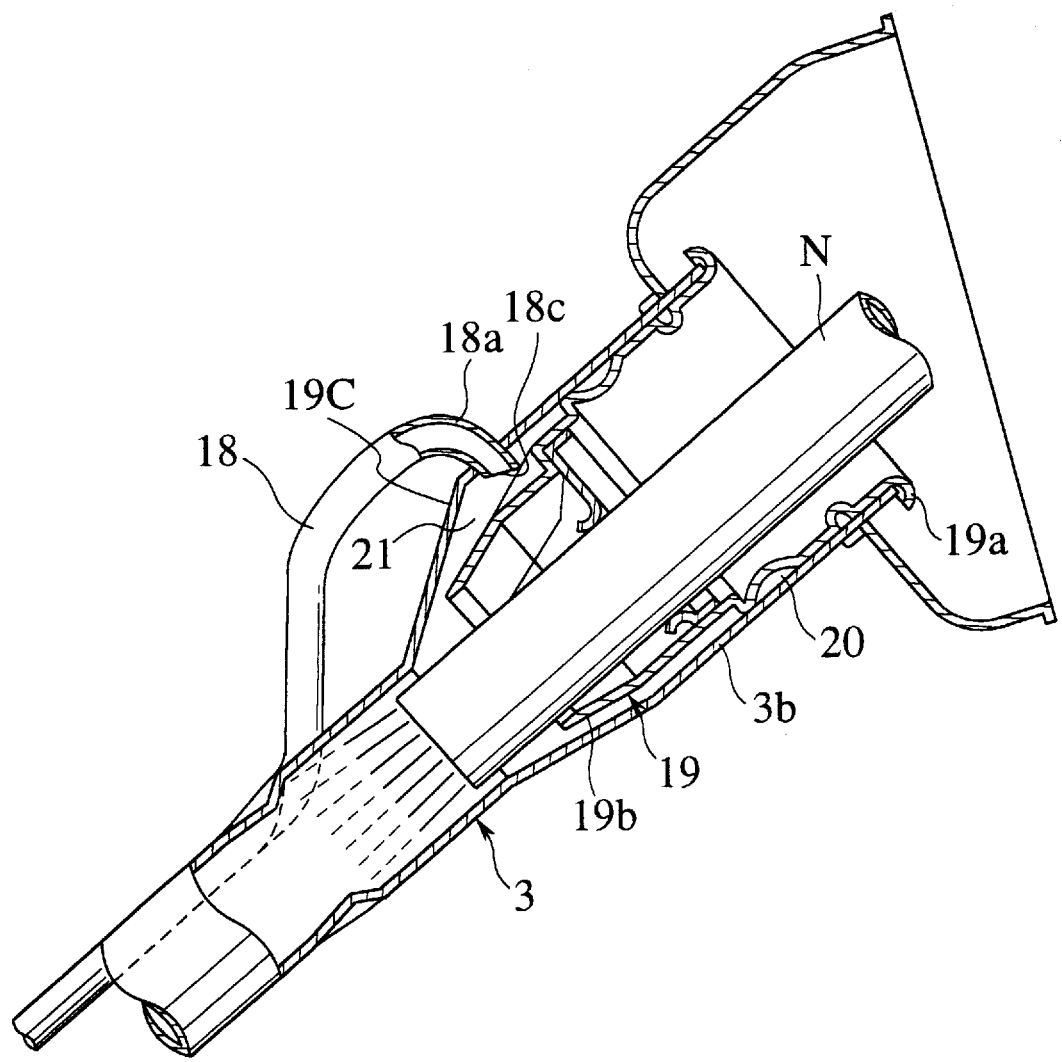
FIG. 4 is a sectional view of the filler tube as shown in the first embodiment showing the portion connected with the circulation tube.
Figure 5:
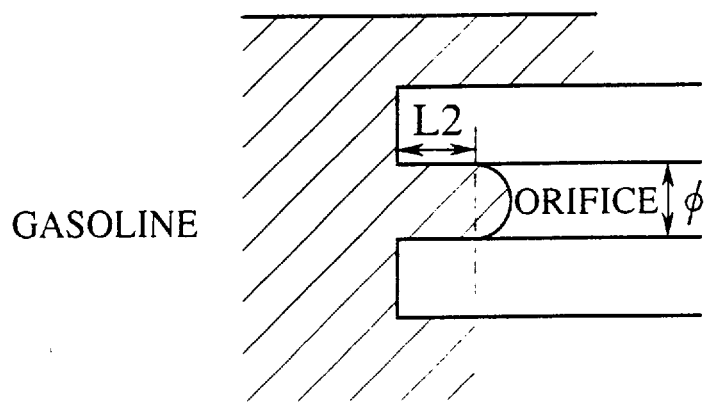
FIG. 5 is an explanatory view showing the state wherein the relationship between the inside diameter of the orifice and the permeation length of the gasoline into this orifice is measured.

Also, the upper part 2b of the tank body 2 is connected with the filler tube 3b with the circulation tube 18. As shown in FIG. 2, the upper part 18a of this circulation tube 18 on the connecting side of the filler tube 3 is connected with the vicinity of the upper part 13a of the signal tube. And as shown in FIG. 4, the upper part 18a of this circulation tube is open above the inserting end of the filling nozzle N at the time of filling fuel, and as shown in FIG. 1, the lower part thereof is provided with an orifice(circulation tube orifice) 18b. For better understanding, the upper part 13a of the signal tube and the upper part 18a of the circulation tube are illustrated separately in the up-down directionom FIG. 1, but actually, their heights are approximately the same and they are separated in the lateral direction as shown in FIGS. 2 and 3.

The orifice 18b controls the circulation amount of the vapor to be circulated into the filler tube 3 from the tank body 2 via the circulation tube 18 and is arranged so that the circulation amount of the vapor may not become greater than the amount of the inhaled gaseous body to be drawn into the tank body 2 by the fuel flow-in negative pressure at the time of filling fuel.

Further, the inside diameter of the filler tube 3 is formed to be narrower than the conventional ones, so that the space with the circumferencial surface of the filling nozzle N may become smaller, thus making it easier to obtain the fuel flow-in negative pressure at the time of filling fuel.

Further, a cylindrical body 19 is inserted and mounted in the upper part 3b of the filler tube 3. That is, a flange portion 19a is formed at the upper end of this cylindrical body as shown in FIGS. 3 and 4, so that it can be hung on the edge of the upper part 3b of the filler tube, and the inner circumferencial wall of the lower part thereof is filled up with a sealing material 20 all over the circumferencial surface under the upper end 3b of the fuel filler tube. This fill-up position lies in the upper vicinity of the connecting positions 13a, 18a of the signal tube 13 and the circulation tube 18. Further, the lower part 19b of this cylindrical body 19 becomes gradually narrower.

In this manner, an air-storing part or air plenum 21 is formed at the connection position of the upper part 13a of the signal tube between the upper part 3b of the filler tube and the cylindrical body 19, and the air in the air-storing part 21 enters into the signal tube 13 at the time of the turning actions, etc. of vehicles thus to prevent the permeation of fuel into the signal tube 13.

The volume VI of this air-storing part 19 is so determined as to satisfy the formula (1):

$$V1 \geq V2 \times (P2/P1) \tag{1}$$

wherein V2 is the volume of the signal tube 13; P1 is the atmospheric pressure; and P2 is the pressure of the valve when its cap is open.

Here the pressure of the valve when its cap is open is that of the filler cap which is not shown.

Likewise, by the lower part 19b of this cylindrical body 19 is constituted the "guiding means" for guiding the vapor circulating from the circulation tube 18 into the filler tube 3 towards the lower part of this filler tube 3.

On the other hand, the inside diameter of the flow-out side tube 8b of the vent side tube 8 is 13 mm and an orifice(the orifice for the vent side tube) 22 having an inside diameter of 13 mm is provided in this flow-out side tube 8b. The shape and size of this orifice 22 are determined so that it may make it difficult for the vapor to go through into the side of the canister 9 and accordingly that the vapor in the tank body 2 may readily circulate into the side of the filler tube 3 via the circulation tube 18.

Further, the canister 9 is open into the atmosphere at the opening 14 and is connected with the engine side via the tube 15 at the same time, Next the functions are explained.

When filling fuel, the filler cap of the filler tube 3 is opened and the fuel filling nozzle N is inserted from the fuel filling mouth of this tube 3 to fill fuel, as shown in FIG. 4. The fuel flows into the tank body 2 from the filler tube 3, when part of the vapor to be produced in the tank body 2 is introduced into the canister 9 via the vent side check valve 11. That is, the first chamber 11b has the pressure of the filler tube 3, namely, the atmospheric pressure while the filler cap is open, while the pressure of the tank body 2 becomes higher than the atmospheric pressure by the flow-in pressure of the fuel. This causes the diaphragm 11a to be moved up against the resilience of the coil spring to open the flow-in side tube 8a, and the vapor is guided to the canister 9 via the flow-out side tube 8b. After the fuel has been adsorbed, the air is exhausted into the atmosphere. This way the gas in the tank body 2 is removed to smoothen the fuel filling.

Also, the vapor in the tank body 2 flows into the side of the canister 9 as mentioned above and is simultaneously circulated into the filler tube 3 via the circulation tube is. The flow-in position of the vapor into this filler tube 3 is above the tip of the fuel filling nozzle and this position is the one where it turns to be a negative pressure when the fuel is jetted from the fuel filling nozzle N. Accordingly, the vapor from the circulation tube 18 is flowed again into the tank body 2 together with the fuel via the filler tube 3 thus to be circulated. At the time of filling fuel, this causes the amount of the outside air drawn into the filler tube 3 from the atmosphere to decrease. As the result thereof, the amount of the vapor to be flowed into the caster 9 via the vent side check valve 11 can be decreased and the canister can be designed to be smaller.

Further, the vapor circulated into the filler tube from the circulation tube 18 is guided towards the lower part of the filler tube 3 in the lower pat 19b of the cylindrical body 19 and accordingly the circulation efficiency is improved, thus preventing the release of the vapor containing this fuel component into the atmosphere and also further controlling the inhalation of the outside air.

Further, the provision of the orifice 22 in the flow-out side tube 8b makes the vapor in the tank body 2 difficult to go through into the side of the canister 9 at the time of filling fuel, and the increase of the amount of vapor circulated into the side of the filler tube 3 from the circulation tube 218 can control the amount of the vapor to be borne in the tank body 2.

In addition to this, the provision of the orifice 18b in the circulation tube 18 causes the vapor amount circulated into the side of the filler tube 3 from this tube 18 not to be greater than the inhaling amount of the gaseous body flowing into the tank body 2 by the fuel flow-in negative pressure at the time of filling fuel, this preventing the circulated vapor thereof from being released into the atmosphere.

And, when the fuel is supplied fully in to the tank body 2, the float 6a of the vent side float valve 6 floats up to close the opening 6b thus preventing the flow-in of the fuel into the flow-in side tube 8a, and also the lower part of the circulation tube 18 is soaked in the fuel. This causes the fuel to stay reaching up to the upper part 3b of the filler tube 3 in the state wherein the air layer is secured in the tank body 2.

On the other hand, if the pressure in the tank body 2 goes over a certain level in the state wherein the filler cap is closed, the pressure in the filler tube 3 also becomes the same pressure as that of the tank body 2. By this, the pressure of the first chamber 11b of the vent side check valve 11 becomes the same pressure as that of the flow-in side tube 8a of the vent side tube 8, so that the vent side check valve 11 maintains the closed state.

Likewise, in the conventional systems, when vehicles made turning actions and when the pressure of the tank body 2 went up in the state wherein the fuel was fully filled up to the upper end 13a of the signal tube, it was often the case that the fuel would permeate into the inner part from the upper end 13a of the signal tube. However, the provision of the air-storing part 21 and simultaneously of the orifice 17a at the upper end 13a of the signal tube will prevent such inconveniences.

That is, by providing the air-storing part 21, the air in the air-storing part 21 permeates into the signal tube 13a before the permeation of the fuel into the upper end 13a of the signal tube and also the volume of this air-storing part 21 is predetermined as mentioned above. Therefore, even if the pressure in the tank body 2 goes up to the level of opening the valve, the fuel does not permeate into the signal tube 13.

Likewise, thanks to the provision of the orifice 17a of a predetermined inside diameter $\phi$ and length L at the upper end 13a of the signal tube, the fuel does not permeate into the signal tube 13 passing through this orifice 17a even when the fuel leaps up due to the turning actions of vehicles although some fuel permeates into this orifice 17a. The small amount of fuel which has permeated into this orifice 17a may be removed from the orifice 17a as it evaporates later and as it is inhaled into the side of the filler tube 3 by the negative pressure at the time of filling fuel.

In this manner, the permeation of the fuel into the signal tube 13 can be prevented and therefore, the function of the vent side check valve 11 can be maintained normal.

On the other hand, during the running actions, etc. of a vehicle, the evaporation side check valve 10 is so arranged as to be opened by the higher pressure than the valve opening pressure of the vent side check valve 11 at the time of filling fuel. However, the vent side check valve 11 maintains the closed state even when the pressure in the tank body 2 goes up since both the surfaces of the diaphragm 11a are subjected to the same inner pressure when the filler cap is closed. The evaporation side check valve 10 opens for the evaporated gas to be introduced into the canister 9 via the evaporation side tube 7 when it has reached the predetermined level thereof.

Further, according to the first embodiment, the provision of only the cylindrical body 19 can constitute the air-storing part 21 and the guide means as well thus simplifying the structure.

Further, according to the embodiment, as shown in FIG. 4, the upper part 18a of the circulation tube is open above the inserting end of the filling nozzle N at the time of filling fuel, and has an inclined opening 18c formed whereby the opening is inclined. Accordingly, there is not a fear that the upper part 18a of the circulation tube is not fitted to the fitting member 17 by mistake.

Further, since the fitting member 17 is formed by a member differed from the signal tube 13, an inside diameter $\phi$ and length L of the orifice do not depend on the signal tube 13 (although it is necessary to be less than a diameter of the signal tube 13), so that it is possible to set the orifice flexibly.

Accordingly, in case of a different fuel filling function, etc., without exchanging the signal tube 13, only the fitting member 17 can be exchanged.

Figure 6:
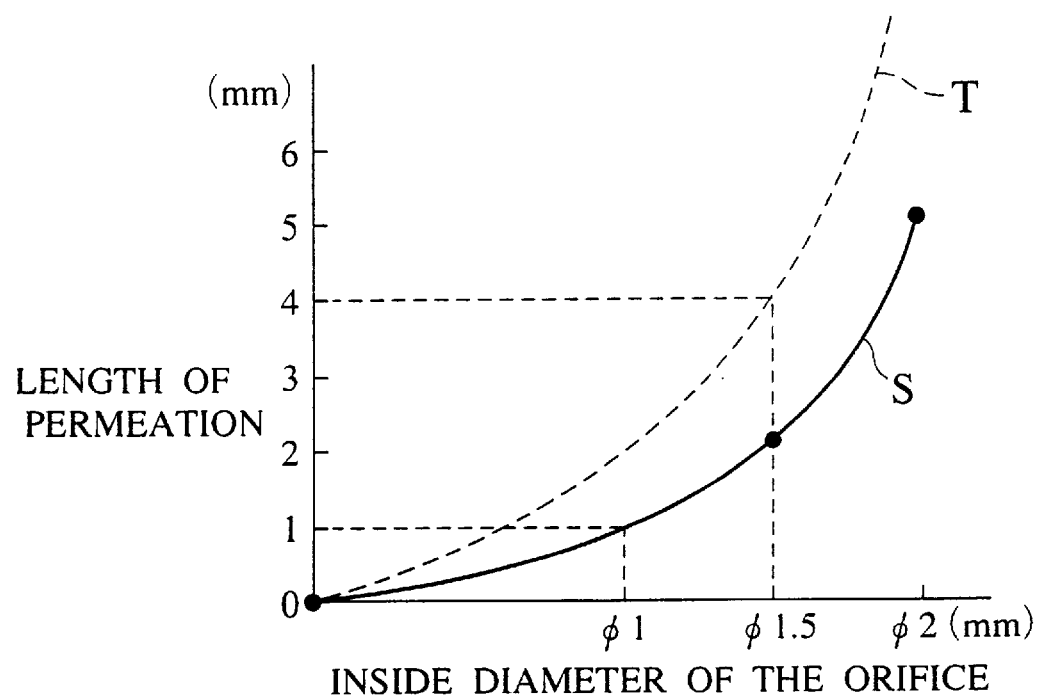
FIG. 6 is a graph showing the relationship between the inside diameter of the orifice and the permeation length of the gasoline into this orifice.

Here the inside diameter $\phi$ and length L of the orifice 17a at the upper end 13a of the signal tube are determined as follows;

That is, measuring the relationship between the inside diameter $\phi$ of the orifice and the permeating length L of gasoline into the orifice 17a in the case wherein the orifice 17a is put into and withdrawn from the gasoline 20 times, the following measured data as shown in the graph in FIG. 6 are obtained. Referring to the characteristic curve S of these actually measured values(of the measured data), if the inside diameter $\phi$ of the orifice 17 is, for example, 1 mm, the permeating length L2 is known to be 1 mm. The inside diameter φ of the orifice 17a and length L are determined based upon the these data. If the safety ratio is doubled such that no gasoline may permeate into the signal tube 13, the length L1 of the orifice 17a to be determined is known to be 2 mm when the inside diameter φ of the orifice 17a is 1 mm as shown in the characteristic curve T. As the results of our confirmation actually with the filler tube 3, when the inside diameter φ of the orifice 17a is 1.5 mm and the length L 1 is 4 mm, the permeating amount of gasoline into the filler tube 3 is 0 cc. When the inside diameter φ is 2.0 mm and the length L of the orifice 17a is 4 mm, the permeating amount of gasoline into the signal tube 13 has been confirmed to be 2 cc. Therefore, the above-mentioned measured data have been proved to be effective as the data for determining the inside diameter φ and the length L of the orifice 17.

Figure 7:
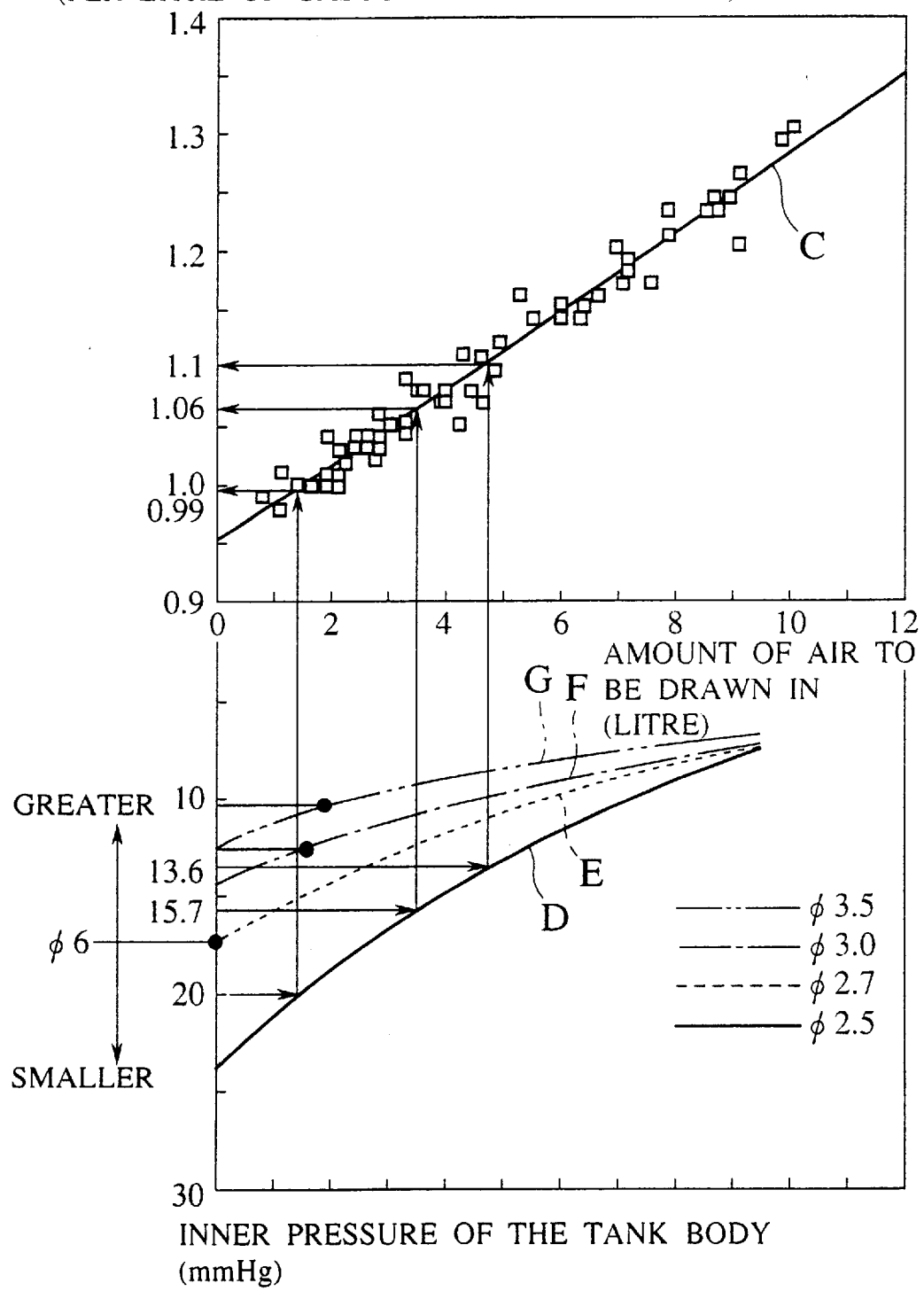
FIG. 7 is a graph showing the relationship among the amount of the air drawn in, the amount of the vapor produced and the pressure inside the tank body.

Likewise, the inside diameters of the orifice 18b of the circulation tube 18 and of the orifice 22 of the vent side tube 8 are determined as follows:

That is, the relationship between the inhaling amount of the air to be drawn in and the amount of the vapor to be produced at the time of filling one liter of gasoline is shown in the characteristic curve C as shown in FIG. 7. Likewise, the relationship between the inner pressure of the tank body 2 and the inhaling amount of the air to be drawn in is shown in the characteristic curves D, E, F, G as shown in FIG. 7. The inside diameter of the orifice 18b of the circulation tube 18 is 2.5 mm in the case of the characteristic curve D of the solid line, 2.7 mm in the case of the characteristic curve E of the long dotted line, 3.0 mm in the case of the characteristic curve F of the single-dot chained line and 2.7 mm in the case of the characteristic curve G of the double-dot chained line, and the inside diameter of the orifice 22 of the flow-out side tube 8b varies from 6 mm to the lower level from the higher level.

As is apparent from the characteristic curve C, it is known that if the amount of the air drawn in is decreased, the amount of the vapor to be produced decreases. Accordingly from the respective characteristic curves D, E, F, G it is possible for us to know what inside diameters φ of the orifices 18b and 22 should be determined in order to make the amount of the air drawn in zero. However, if the inside diameters φ is determined such that the amount of the air drawn in may become zero, the amount of the vapor circulated into the filler tube 3 via the circulation tube 18 becomes excessive and this vapor is often discharged into the atmosphere via the filler tube 3. Therefore, it is desirable to determine the inside diameters φ of the orifices 18b and 22 on the basis of the respective characteristic curves D, E, F, G such that the amount of the air drawn in may become a little greater than zero. Likewise, if the pressure in the tank body 2 is too high, it becomes difficult for the fuel to flow into the tank body 2. Therefore, it is desirable to determine the pressure in the tank body 2 in the range of 5 mm/Hg to 25 mmHg.

Figure 8:
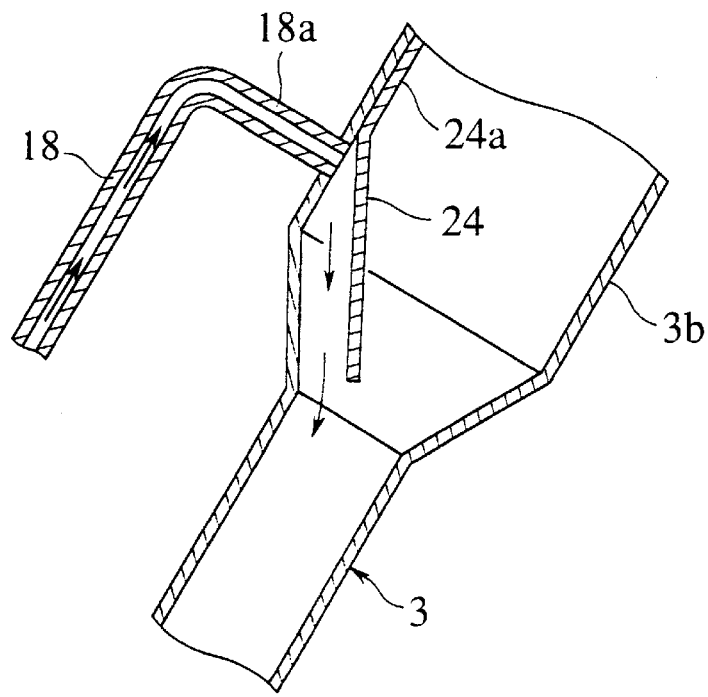
FIG. 8 is a sectional view of the filler tube as shown in the second embodiment showing the portion connected with the circulation tube.

FIG. 8 shows a second embodiment of the present invention.

In the first embodiment as mentioned above, the "guide means" is formed with the lower part 19b of the cylindrical body 19. However, in the second embodiment, the upper part 24a of the flat plate 24 is welded in the filler tube 3 to confront this flat plate 24 towards the upper part 18a of the circulation tube, thereby forming the "guide means" for guiding the vapor flowing into the filler tube 3 from the circulation tube 18 towards the lower part of the filler tube 3.

Figure 9:
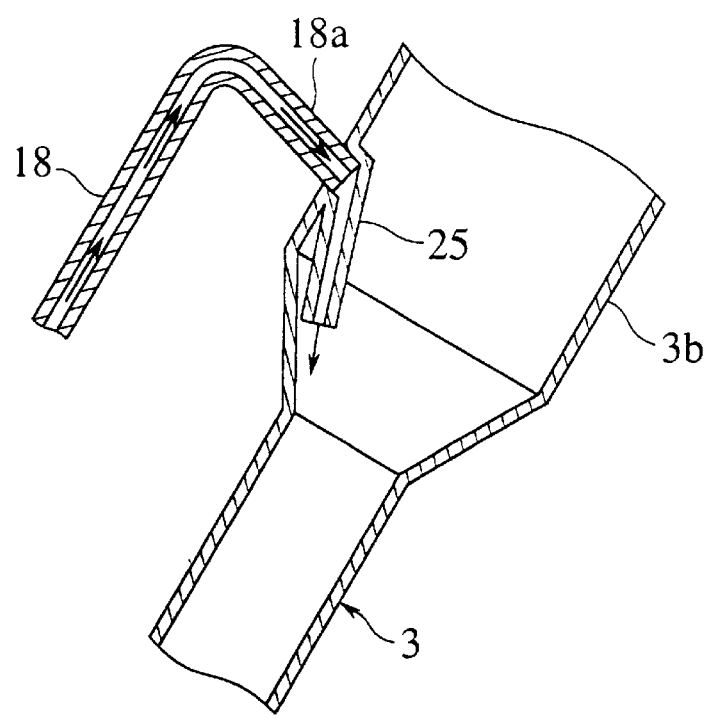
FIG. 9 is a sectional view of the filler tube as shown in the third embodiment showing the portion connected with the circulation tube.

FIG. 9 shows a third embodiment of the present invention.

In the first embodiment, the "guide means" is formed with the lower part 19b of the cylindrical body 19. However, in the third embodiment, a guide tube 25 is provided in the filler tube 3 to continue from the upper part 18a of the circulation tube, thereby forming the "guide means" for guiding the vapor flowing into the filler tube 3 from the circulation tube 18 towards the lower part of the filler tube 3.

Also in the second and third embodiments, the same actions and effects as those of the first embodiment can be obtained.

Figure 10:
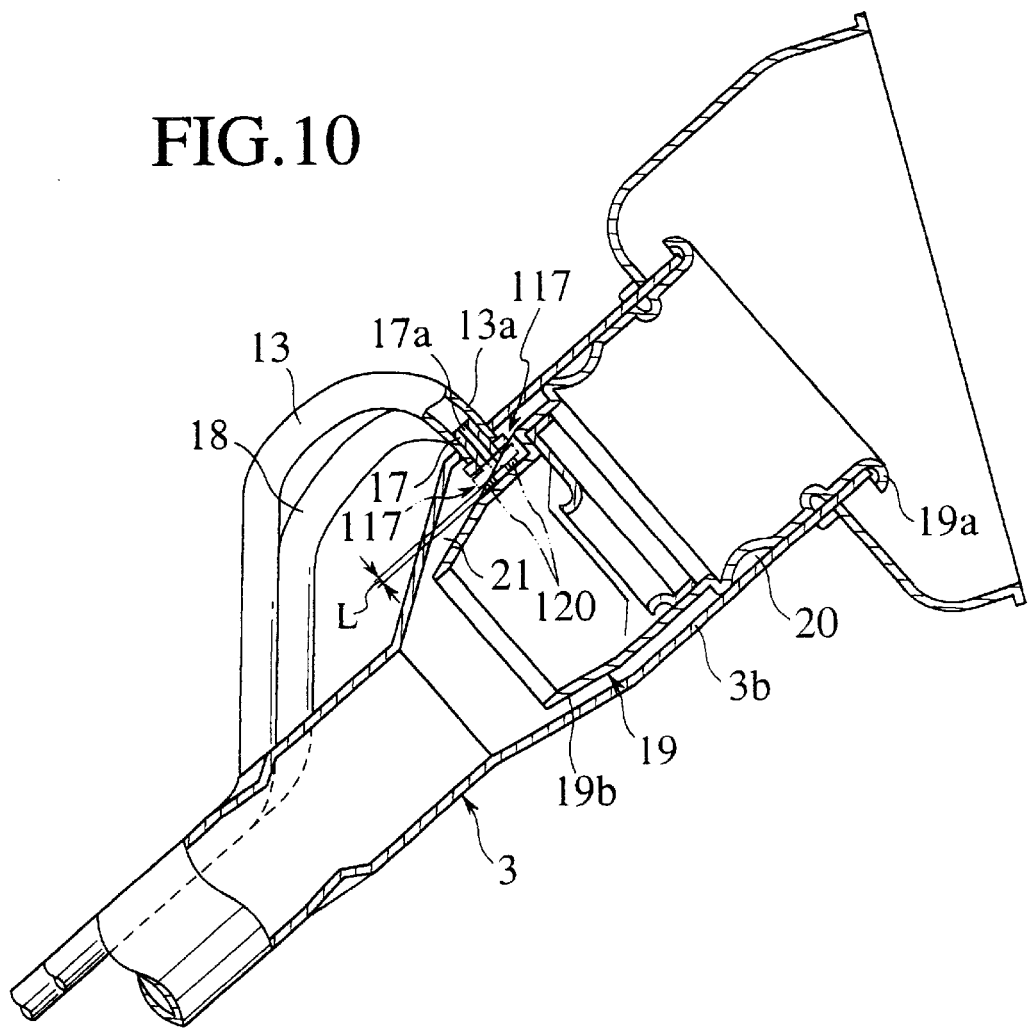
FIG. 10 is a cross-sectional view of the filler tube as shown in the fourth embodiment showing the portion connected with the signal tube.
Figure 11:
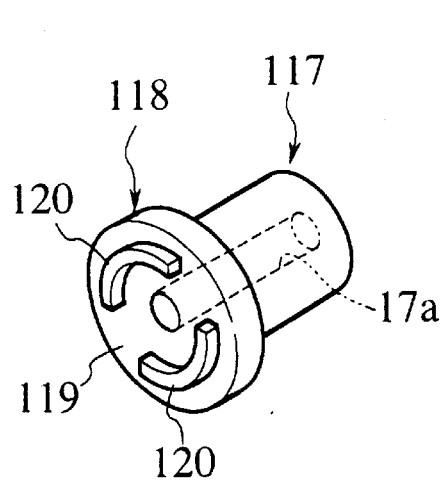
FIG. 11 is a perspective view showing the fitting member as shown in the fourth embodiment.

FIG. 10 and FIG. 11 show the fourth embodiment of the present invention. The elements having the same reference numbers in the first embodiment are the same portions or the corresponding portions in the fourth embodiment.

According to the fourth embodiment, the fitting member 117 having the orifice 17a, fitted on the upper end of the signal tube 13 is mounted.

As shown in FIG. 11, in the fitting member 117, the cylindrical body facing side 119 of the front-side flange 118 is welded in a plane concave portion 19c at a side of the cylindrical body 19. An opening hold projection 120 is formed between the cylindrical body 19 and the fitting member 117 in order to form a predetermined interval.

The opening hold projections 120 are a pair of half arc-shapes so as to form a concentric circle around the opening of the orifice 17a.

Next, effects of the embodiment are explained.

According to a fuel tank system of the embodiment, the fitting member 117 is fitted on the upper end 13a of the signal tube 13 Even if the fitting member 117 is moved from the upper end 13a in a removing direction, as shown by a two-dotted chain line in FIG. 10, the opening hold projections 120 are welded in the plain concave portion 19c of the cylindrical body 19. Thereby, a predetermined interval L is formed between the plain concave portion 19c of the cylindrical body and the fitting member 117 corresponding to a height of the opening hold projection 120 in order to hold the opening of the orifice 17a. Accordingly, the opening of the orifice 17a is adhered to the plain concave portion 19c so as not to be closed.

Further, according to the embodiment, since the plain concave portion 19c is formed at a side of the cylindrical body 19, it is possible not only to use a space efficiently but also to increase a capacity of the air-storing part 21.

Since another construction and effect are approximately same as those of the first embodiment, the explanation is omitted.

Figure 12:
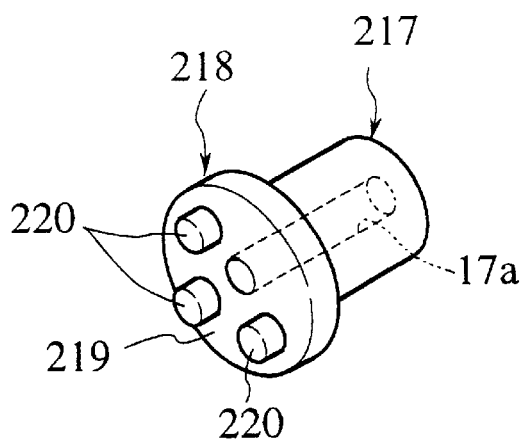
FIG. 12 is a perspective view showing the fitting member as shown in the fifth embodiment.

FIG. 12 shows the fitting member 217 for a fuel tank system according to the fifth embodiment of the present invention.

As shown in FIG. 12, in the fitting member 217, the cylindrical body facing side 219 of the front-side flange 218 is welded in a plane concave portion 19c at a side of the cylindrical body 19. Each opening hold projection 220 . . . for forming a predetermined interval is formed at three positions between the cylindrical body 19 and the fitting member 217.

The opening hold projections 220 . . . are formed as a concentric circle-shape around the opening of the orifice 17a.

Next, an effect of the embodiment is explained.

According to the embodiment, besides an effect of the fourth embodiment, further, the opening hold projections 220 . . . are formed on a circumferential part of the opening of the orifice. Accordingly, when the fitting member 217 is moved in a removing direction in order to be contacted with the plain concave portion 19c so that the ends of all the opening hold projections 220 . . . are welded. Thereby, the fitting member 217 is not inclined so as to be balancedly welded in the cylindrical body, so that it is possible to form a predetermined interval approximately equally in all the directions.

Since another construction and effect are approximately same as those of the fourth embodiment, the explanation is omitted.

What is claimed is:

1. A fuel tank system comprising:

a tank body for containing fuel therein;

a canister for disposing of a gaseous fuel component;

a filler tube connected with said tank body and forming a channel for supplying fuel to said tank body;

a vent check valve having a first chamber and a second chamber separated by a diaphragm;

a signal tube connecting said first chamber of the vent check valve with the upper part of said filler tube;

a vent tube connecting said tank body with said canister via the second chamber of said vent check valve for introducing the gaseous fuel component in said tank body into said canister via said second chamber when filling fuel; and a signal tube orifice disposed in an upper part of said signal tube proximate the filler tube, said signal tube orifice having an inside diameter and length selected to be effective for equalizing pressures in said first chamber and filler tube through said signal tube, and preventing fuel permeation into the signal tube from said filler tube.

2. A fuel tank system comprising:

a tank body for containing fuel therein;

a canister for disposing of a gaseous fuel component;

a filler tube connected with said tank body and forming a channel for supplying fuel to said tank body;

a vent check valve having a first chamber and a second chamber separated by a diaphragm;

a signal tube connecting the first chamber of said vent check valve with an upper part of said filler tube;

a side tube connecting said tank body with said canister via the second chamber of said vent check valve and for introducing the gaseous fuel component in said tank body into said canister via the second chamber when filling fuel; and an air-storing provided in a portion of the filler tube which is connected with the signal tube; said air-storing part being separated from a main space of said filler tube into which a fuel filling nozzle is inserted by a partition member, and which is opened to said main space only on the tank body side, wherein air stored in the air-storing part prevents liquid fuel permeation into the signal tube.

3. A fuel tank system according to claim 2, wherein a signal tube orifice having an inside diameter and a length which are selected in a manner to be effective to equalize pressures in said first chamber and filler tube through said signal tube, and prevent liquid fuel permeation into the signal tube through a filler tube end of said signal tube, is provided in an upper end of the signal tube proximate said filler tube.

4. A fuel tank system according to claim 1, wherein said signal tube orifice is formed in a member fitted into an upper end of said signal tube.

5. A fuel tank system comprising:

a tank body for containing fuel therein;

a canister for disposing of a gaseous fuel component;

a filler tub connected with said tank body and forming a channel for supplying fuel to said tank body;

a vent check valve having a first chamber and a second chamber separated by a diaphragm;

a signal tube connecting said first chamber of the vent check valve with the upper part of said filler tube;

a vent tube for connecting said tank body with said canister via the second chamber of said vent side check valve and for introducing the gaseous fuel component in said tank body into said canister via said second chamber when filling fuel;

a circulation tube connecting the upper part of said tank body with the upper part of said filler tube, said circulation tube having an end connected with said filler tube so as to open above the level of a tip of the fuel filling nozzle inserted at the time of filling fuel; and guiding means for regulating a flow direction of the gaseous fuel component to be circulated into said filler tube from said circulation tube in a manner wherein the gaseous fuel component flows toward said tank body, said guiding means being provided at a portion connected with the signal tube in said filler tube, divided from a main space of said filler tube in which a fuel filling nozzle is inserted, and open to said main space only on the tank body side.

6. A fuel tank system according to claim 1, wherein said inside diameter and the length are determined on the basis of a relationship between the inside diameter of the orifice and a permeating length or distance by which fuel permeates into the orifice when the orifice is put into and withdrawn from liquid fuel.

7. A fuel tank system according to claim 2, wherein: given a volume of said air-storing part is $V1$, a volume of said signal tube is $V2$, an atmospheric pressure is $P1$, and an injection valve opening pressure of a filler-cap arranged on the filler tube is $P2$, a relationship $V1 > V2 \times (P2/P1)$ is satisfied.

8. A fuel tank system according to claim 2, wherein said air-storing part is formed between an inner circumferential wall of said filler tube and a cylindrical body inserted into said filler tube, an upper circumferential portion between said inner circumferential wall and said cylindrical body being sealed, and a lower portion between said inner circumferential wall and said cylindrical body is open.

9. A fuel tank system according to claim 4, wherein said fitting member are fitted from the filler tube side.

10. A fuel tank system comprising:

a tank body for containing fuel therein;

a canister for disposing of a gaseous fuel component;

a filler tube connected with said tank body and forming a channel for supply fuel to said tank body;

a vent check valve having a first chamber and a second chamber separated by a diaphragm;

a signal tube connecting said first chamber of the vent check valve with the upper part of said filler tube;

a vent tube for connecting said tank body with said canister via the second chamber of said vent check valve and for introducing the gaseous fuel component in said tank body into said canister via said second chamber when filling fuel;

a signal tube orifice disposed in the upper part of said signal tube proximate the filler tube side and having an inside diameter and a length that prevents fuel permeation into the signal tube from to said filler tube; and a circulation tube connecting the upper part of said tank body with the upper part of said filler tube; wherein said signal tube orifice comprises a fitting member fitted on an upper end portion of said signal tube, said circulation tube has an upper end portion connected with said filler tube and is disposed next to said upper end portion of said signal tube, said upper end portion of said circulation tube communicates with said filler tube by way of an inclined opening; and said inclined opening is formed to prevent said fitting member fitting thereon.

11. A fuel tank system according to claim 9, further comprising an air-storing part provided at a portion connected with the signal tube in said filler tube, said air-storing part being divided from a main space of the filler tube into which a fuel filling nozzle is inserted, and open to said main space only on the tank body side, wherein air is stored to prevent the fuel permeation into the signal tube.

12. A fuel tank system comprising:

a tank body for containing fuel therein;

a canister for disposing of a gaseous fuel component;

a filler tube connected with said tank body and forming a channel for supplying fuel to said tank body;

a vent check valve having a first chamber and a second chamber separated by a diaphragm;

a signal tube connecting said first chamber of the vent check valve with the upper part of said filler tube;

a vent tube for connecting said tank body with said canister via the second chamber of said side check valve and for introducing the gaseous fuel component in said tank body into said canister via said second chamber when filling fuel; and a signal tube orifice disposed in an upper part of said signal tube proximate the filler tube and having an inside diameter and a length selected to prevent fuel permeation into the signal tube from said filler tube, wherein said orifice for the signal tube is formed by a fitting member fitted on an upper end portion of said signal tube, and said fitting member is welded in a cylindrical body inserted into said filler tube so that a predetermined interval is formed in order to form an opening hold projection for holding an opening of said orifice.

13. A fuel tank system according to claim 11, further comprising an air-storing part provided at a portion connected with the signal tube in said filler tube, said air-storing part being divided from a main space of the filler tube in which a fuel filling nozzle is inserted, and open to said main space only on the tank body side, wherein air is stored to prevent the fuel permeation into the signal tube.

14. A fuel tank system according to claim 13, wherein each said opening hold projection is formed at three positions on a circumferential part of said opening of said orifice, respectively.

15. A fuel tank system comprising:

a tank body for containing fuel therein;

a canister for disposing of a gaseous fuel component;

a filler tube connected with said tank body and forming a channel for supplying fuel to said tank body;

a vent check valve having a first chamber and a second chamber separated by a diaphragm;

a signal tube connecting said first chamber of the vent check valve with the upper part of said filler tube;

a vent tube for connecting said tank body with said canister via the second chamber of said vent side check valve and for introducing the gaseous fuel component in said tank body into said canister via said second chamber when filling fuel; and a circulation tube connecting the upper part of said tank body with the upper part of said filler tube, an end of said circulation tube being connected with said filler tube so as to open above the inserting tip of the fuel filling nozzle which is inserted at the time of filling fuel; wherein said circulation tube is provided with a circulation tube orifice for limiting the circulating amount of the gaseous fuel component to be circulated into said filler tube from said tank body via said circulation tube; and the diameter of said orifice is determined so that the circulating amount of the gaseous fuel component is not greater than the inducted amount of gaseous fuel component which flows flowed into said tank body under the influence of a negative pressure produced by inflowing fuel at the time of filling fuel.

16. A fuel tank system comprising:

a tank body for containing fuel therein;

a canister for disposing of a gaseous fuel component;

a filler tube connected with said tank body and forming a channel for supplying fuel to said tank body;

a vent check valve having a first chamber and a second chamber separated by a diaphragm;

a signal tube connecting said first chamber of the vent check valve with the upper part of said filler tube;

a vent tube for connecting said tank body with said canister via the second chamber of said vent side check valve and for introducing the gaseous fuel component in said tank body into said canister via said second chamber when filling fuel; and a circulation tube connecting the upper part of said tank body with the upper part of said filler tube, an end of said circulation tube being connected with said filler tube opening into said filler tube at a level above the tip of the fuel filling nozzle inserted at the time of filling fuel; wherein said vent tube is provided with an orifice which facilitates the circulation of the gaseous fuel component in said tank body into the filler tube from said tank body via said circulation tube by increasing the flow resistance to said canister.

17. A fuel tank system according to claim 5, wherein said guiding means is an air-storing part in which air is stored to prevent the fuel permeation into the signal tube.

18. A fuel tank system according to claim 5, wherein said guiding means is formed between an inner circumferential wall of said filler tube and a cylindrical body inserted in said filler tube, an upper circumferential portion between said inner circumferential wall and said cylindrical body being sealed, and an under portion between said inner circumferential wall and said cylindrical body being open.

19. A fuel tank system according to claim 12, wherein each said opening hold projection is formed at three positions on a circumferential part of said opening of said orifice, respectively.

* * * * *